(12) United States Patent
Kapoor et al.

(10) Patent No.: US 11,151,011 B2
(45) Date of Patent: Oct. 19, 2021

(54) UNCORE INPUT/OUTPUT LATENCY ANALYSIS

(71) Applicant: International Business Machines Corporation, Armonk, NY (US)

(72) Inventors: Shakti Kapoor, Austin, TX (US); Daniel Isaac Rodriguez, Austin, TX (US); Miguel Gomez Gonzalez, Zapopan (MX); Anatoli Andreev, Chassell, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/589,390

(22) Filed: Oct. 1, 2019

(65) Prior Publication Data

US 2021/0099373 A1    Apr. 1, 2021

(51) Int. Cl.
| | | |
|---|---|---|
| *G06F 11/34* | (2006.01) | |
| *G06F 11/30* | (2006.01) | |
| *H04L 12/26* | (2006.01) | |
| *H04L 12/855* | (2013.01) | |

(52) U.S. Cl.
CPC ...... *G06F 11/3409* (2013.01); *G06F 11/3051* (2013.01); *H04L 43/0829* (2013.01); *H04L 43/0852* (2013.01); *H04L 43/0894* (2013.01); *H04L 47/2466* (2013.01)

(58) Field of Classification Search
None
See application file for complete search history.

(56) References Cited

U.S. PATENT DOCUMENTS

| | | | | |
|---|---|---|---|---|
| 4,651,316 A | * | 3/1987 | Kocan | ..................... H04L 12/44 370/462 |
| 8,566,628 B2 | | 10/2013 | Branover et al. | |
| 9,558,145 B2 | | 1/2017 | Harriman et al. | |
| 9,668,204 B2 | | 5/2017 | Rabii et al. | |

(Continued)

OTHER PUBLICATIONS

Cho et al., "Understanding soft errors in uncore components." Proceedings of the 52nd Annual Design Automation Conference, Jun. 2015 (8 pages).

(Continued)

*Primary Examiner* — Aaron N Strange
*Assistant Examiner* — Mohammad Yousuf A. Mian
(74) *Attorney, Agent, or Firm* — Cantor Colburn LLP; Bryan Bortnick

(57) ABSTRACT

A computing system includes a core system and an uncore system. The core system includes a packet generator unit configured to generate a data packet having a plurality of bytes defining a target packet size, and to output a first byte among the plurality of bytes at a packet delivery start time. The uncore system includes an input/output (I/O) bridge configured to connect an I/O component to the core system, and a packet monitor unit configured to monitor the bytes delivered from the packet generator unit to the I/O component. The packet monitor unit further determines a packet delivery end time after detecting a last byte of the data packet. The computing system determines a latency attributed to the uncore system and the I/O bridge based on the packet delivery start time and the packet delivery end time.

17 Claims, 3 Drawing Sheets

(56) References Cited

U.S. PATENT DOCUMENTS

| | | | |
|---|---|---|---|
| 10,033,523 B1 | 7/2018 | Remla et al. | |
| 2003/0103514 A1* | 6/2003 | Nam | H04L 49/9057 370/412 |
| 2003/0221000 A1* | 11/2003 | Cherkasova | H04L 67/125 709/224 |
| 2004/0062252 A1* | 4/2004 | Dowdal | H04J 3/0632 370/395.62 |
| 2016/0124894 A1* | 5/2016 | Harriman | H04L 43/106 710/105 |
| 2017/0078211 A1* | 3/2017 | Fukunaga | H04L 47/2441 |
| 2017/0322886 A1 | 11/2017 | Mukherjee et al. | |
| 2018/0150240 A1 | 5/2018 | Bernat et al. | |
| 2019/0007153 A1* | 1/2019 | Linsky | H04L 47/10 |
| 2019/0179757 A1* | 6/2019 | Walker | G06F 13/161 |

OTHER PUBLICATIONS

Gou et al., "Addressing GPU on-chip shared memory bank conflicts using elastic pipeline." International Journal of Parallel Programming 41.3 (Jun. 2013) pp. 400-429.

Hammarlund et al., "Haswell: The fourth-generation intel core processor." IEEE Micro 34.2 (Mar./Apr. 2014) pp. 6-20.

\* cited by examiner

UNCORE INPUT/OUTPUT LATENCY ANALYSIS

BACKGROUND

The present invention generally relates to computing systems, and particularly, systems and methods of analyzing latency associated with uncore and input/output subsystems.

Modern computing systems include a processing chip having a core memory management unit (MMU) and a non-core MMU. The core MMU (sometimes referred to the processing core, core system, or simply "the core") performs virtual to physical address translations. For example, the processing core may assign blocks of virtual memory to different processes executing on the processor (e.g., operating systems or user applications). Each of the virtual addresses corresponds to a physical memory address in memory. The mappings between the virtual and physical addresses are stored in a page table as page table entries. The page table is typically stored in main memory. When a process sends a request to a processing core to read data from, or write data to, a particular virtual address, the core queries the page table (or a translation lookaside buffer) to identify the corresponding physical address. The processing core then uses the physical address to perform the read or write requested by the process.

The non-core MMU (sometimes referred to as the non-core system or simply "the uncore") is external to the processor core of the processor chip. A communication link such as host bus establishes a data exchange path between the core and the uncore. Unlike the core, the non-core may be located in a part of the processor chip outside of the processing cores in the chip. Instead of being used to perform address translation requests sent by the processing core, the non-core may be used by other hardware modules in the processor chip such as compression engines, crypto engines, accelerators, etc. Using the data provided in the translation requests, the non-core performs virtual to physical address translations.

SUMMARY

According to a non-limiting embodiment of the invention, a computing system includes a core system and an uncore system. The core system includes a packet generator unit configured to generate a data packet having a plurality of bytes defining a target packet size, and to output a first byte among the plurality of bytes at a packet delivery start time. The uncore system includes an input/output (I/O) bridge configured to connect an I/O component to the core system, and a packet monitor unit configured to monitor the bytes delivered from the packet generator unit to the I/O component. The packet monitor unit further determines a packet delivery end time after detecting a last byte of the data packet. The computing system determines a latency attributed to one or both of the uncore system and the I/O bridge based at least in part on the packet delivery start time and the packet delivery end time.

According to another non-limiting embodiment of the invention; a computer-implemented method is performed by a computing system comprising a core system and an uncore system. The method comprises generating, by a packet generator unit operating in the core system, a data packet having a plurality of bytes defining a target packet size, and outputting a first byte among the plurality of bytes at a packet delivery start time. The method further comprises monitoring, by a packet monitor unit operating in the uncore system, the bytes delivered from the packet generator unit to the I/O component and to determine a packet delivery end time after detecting a last byte of the data packet. The method further comprises determining, by the computing system, a latency attributed to one or both of the uncore system and the I/O bridge based at least in part on the packet delivery start time and the packet delivery end time.

According to yet another non-limiting embodiment of the invention, a computer program product controls a computing system comprising a core system and an uncore system. The computer program product comprises a computer readable storage medium having program instructions embodied therewith. The program instructions are executable by an electronic computer processor to control the electronic device to perform operations comprising generating, by a packet generator unit operating in the core system, a data packet having a plurality of bytes defining a target packet size, and outputting a first byte among the plurality of bytes at a packet delivery start time. The method further comprises monitoring, by a packet monitor unit operating in the uncore system, the bytes delivered from the packet generator unit to the I/O component and to determine a packet delivery end time after detecting a last byte of the data packet. The method further comprises determining, by the computing system, a latency attributed to one or both of the uncore system and the I/O bridge based at least in part on the packet delivery start time and the packet delivery end time.

DETAILED DESCRIPTION

Latency analysis in a computing system is typically performed by measuring the latency of data packets exchanged between the core to the network and back to the core. The latency of the data exchange is the latency associated with the data packets traveling specifically through to the input/output (I/O) bridge and uncore subsystem of the computing system typically measured by connecting two systems running the network stack provided by the network card vendors. Accordingly, designers aim to reduce latency by optimizing the core, which can be very time consuming.

Rather than optimize the core, optimization of the data packets exchanged between the uncore and the input/output (I/O) bridge has shown to improve overall latency of the computing system and can be achieved in less time. However, although the conventional method of measuring data packets between the core to the network and back to the sending core provides information indicating the overall latency of a system, it fails to indicate a portion of the latency associated with the data packets traveling specifically through to the input/output (I/O) bridge and uncore subsystem of the computing system. Therefore, the current method of analyzing latency is incapable of optimizing the data packet latency between the uncore and the input/output (I/O) bridge.

Various non-limiting embodiments provide a computing system that implements a uncore I/O latency analysis sub-system capable of detecting a portion of the latency associated with data packets delivered between the uncore and the I/O bridge. An uncore I/O latency analysis sub-system includes a packet generator unit included in the core system and a packet monitor unit included in an I/O component installed in the uncore system. The packet generator unit generates a data packet having a plurality of bytes defining a target packet size. A first byte of the data packet is output at a detected packet delivery start time. The packet monitor unit is configured to monitor the bytes delivered from the packet generator unit to the I/O component and to determine a packet delivery end time after detecting a last byte of the data packet. In this manner, the computing system can determine a latency attributed to one or both of the uncore system and the I/O bridge based at least in part on the packet delivery start time and the packet delivery end time.

Figure 1:
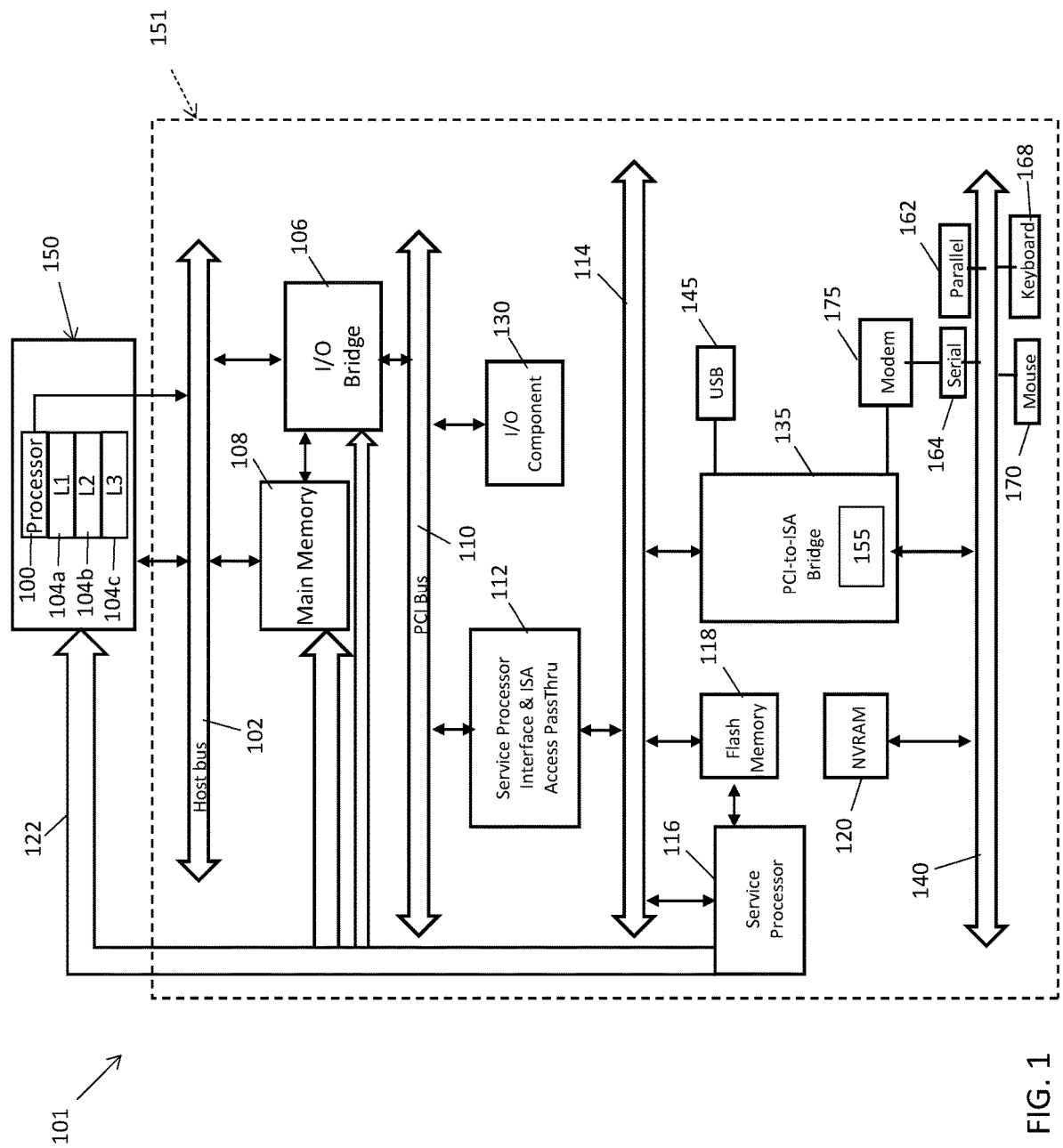
FIG. 1 is a block diagram of a computing device capable of implementing a non-limiting embodiment of the present invention.

Turning now to FIG. 1, a computer system 101 capable of performing the computing operations described herein. The computer system 101 includes a core system 150 (referred to herein as the core 150) and an uncore system 151 (referred to herein as the uncore 151). The core 150 is coupled to a host bus 102, and includes a processor 100 along with a plurality of caches. The caches include a first level cache (L1) 104a, a second level cache (L2) 104b, and a third level cache (L3) 104c. The number of caches, however, are not limited thereto and can include more or less caches. The uncore 151 is referred to herein as the portion of the computing system 101 that includes the remaining components excluded from the core 150.

An input/output (I/O) bridge 106 (sometimes referred to as a host-to-PCI bridge) is coupled to main memory 108. The I/O bridge 106 includes cache memory and main memory control functions, and provides bus control to handle transfers the among PCI bus 110, the processor(s) 100, the caches 104a, 104b, 104c, the main memory 108, and the host bus 102. Main memory 108 is coupled to the I/O bridge 106 as well as host bus 102. Devices used solely by host processor(s) 100, such as LAN card 130, are coupled to PCI bus 110. Service Processor Interface and ISA Access Pass-through 112 provides an interface between PCI bus 110 and PCI bus 114. In this manner, PCI bus 114 is insulated from PCI bus 110. Devices, such as flash memory 118, are coupled to PCI bus 114. In one implementation, flash memory 118 includes BIOS code that incorporates the necessary processor executable code for a variety of low-level system functions and system boot functions.

The PCI bus 114 provides an interface for a variety of devices that are shared by host processor(s) 900 and Service Processor 116 including, for example, flash memory 118. PCI-to-ISA bridge 135 provides bus control to handle transfers between PCI bus 114 and ISA bus 140, universal serial bus (USB) functionality 145, power management functionality 155, and can include other functional elements not shown, such as a real-time clock (RTC), DMA control, interrupt support, and system management bus support. Nonvolatile RAM 920 is attached to ISA Bus 140. Service Processor 116 includes JTAG and I2C busses 22, which facilitates communication with processor(s) 100 (e.g., during initialization steps), the I/O bridge 106, and the main memory 108. Service Processor 116 also has access to system power resources for powering down information handling device 101.

Peripheral devices and input/output (I/O) devices can be attached to various interfaces (e.g., parallel interface 162, serial interface 164, keyboard interface 168, and mouse interface 170 coupled to ISA bus 140. Alternatively, many I/O devices can be accommodated by a super I/O controller (not shown) attached to ISA bus 140.

In order to attach computer system 101 to another computer system to copy files over a network, LAN card 130 is coupled to PCI bus 110. Similarly, to connect computer system 101 to an ISP to connect to the Internet using a telephone line connection, modem 175 is connected to serial port 164 and PCI-to-ISA Bridge 135.

While FIG. 1 shows one information handling system that employs processor(s) 100, the information handling system may take many forms. For example, information handling system 101 may take the form of a desktop, server, portable, laptop, notebook, or other form factor computer or data processing system.

Figure 2:
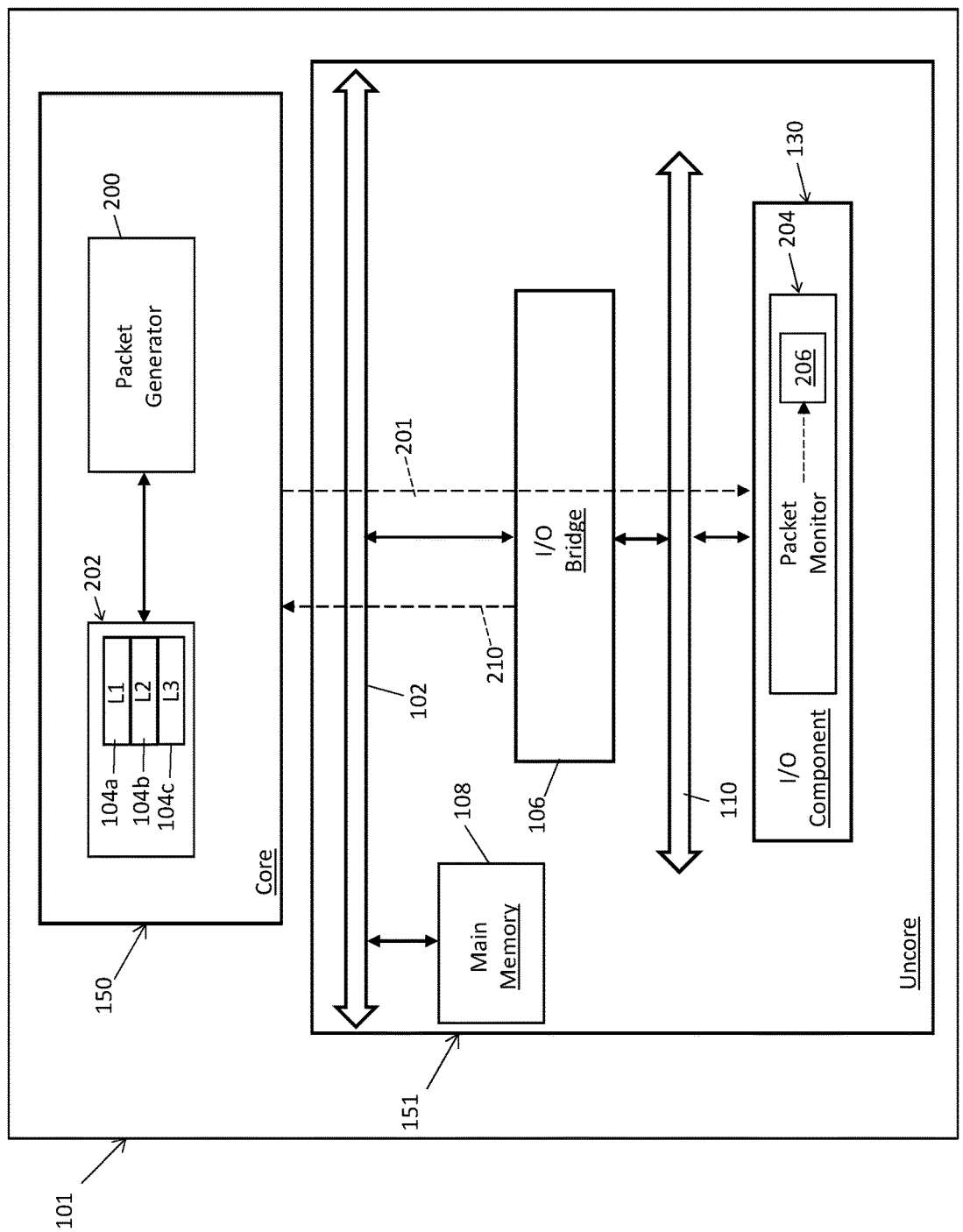
FIG. 2 is a block diagram of an uncore input/output (I/O) latency analysis sub-system included in a computing system according to a non-limiting embodiment of the invention.

Turning now to FIG. 2, an uncore I/O latency analysis sub-system included in a computing system 101 is illustrated according to a non-limiting embodiment of the invention. The uncore I/O latency analysis sub-system includes a packet generator unit 200 included in the core system 150 and a packet monitor unit 204 included in an I/O component 130 installed in the uncore system 151. The input/output (I/O) bridge 106 is in signal communication with the host bus 102 and the PCI bus 110. The host bus 102 is in signal communication with the core system 150 and the PCI bus 110 is in signal communication with one or more I/O components. In this manner, signal communication is established between the packet generator unit 200 and the I/O component 130. Any one of the packet generator module 200 and the packet monitor module 204 can be constructed as an electronic hardware controller that includes memory and a processor configured to execute algorithms and computer-readable program instructions stored in the memory.

The packet generator unit 200 operates on the core system 150 using a minimum number of instructions without the involvement of a TCP/IP stack or a device driver. For example, the packet generator unit 200 can execute code written in Assembly language or "C" code language, allowing a small amount of code that is highly optimized so that the impact on the overall latency is minimal. In addition, the packet generator unit 200 can operate in a kernel mode to obviate any interrupts that may occur when performing the latency analysis. When initiating the latency analysis, the packet generator unit 200 outputs a data packet 201 having a plurality of bytes defining a target packet size. The time at which the first byte of the data packet 201 is output from the packet generator unit 200 is defined as the packet delivery start time.

The packet generator unit 200 is in signal communication with cache memory 202, along with the main memory 108 via the host bus 102. In this manner, the packet generator unit can set an acknowledgment (ACK) byte (sometimes referred to as a flag), which indicates that the last byte of the data packet 201 is delivered to the I/O component 130. The ACK byte can be set by storing the ACK byte in the main memory 108 and/or by cache injecting (via the packet generator unit 200) the ACK byte in the cache memory 202. Accordingly, when the ACK byte is set, the packet generator unit 200 can determine that the last byte of the generated data packet 201 has been delivered through the I/O bridge 106 and to the I/O component 130.

The packet monitor unit 204 is configured to monitor the bytes of the data packet 201 delivered from the packet generator unit 200 to the I/O component 130. In one or more embodiments, the I/O component 130 can include a field programmable gate array (FPGA) I/O card that implements the packet monitor unit 204; however, the invention is not limited thereto.

The packet monitor unit 204 includes a monitor memory unit 206, which can store a target data packet size parameter. The target data packet size parameter can be set by the packet generator unit 200 and sent to the packet monitor unit 204 prior to outputting the first byte of the data packet 201. In this manner, the packet monitor unit 204 can poll (i.e., count) the bytes received by the I/O component 130 and compare the total number of counted bytes at a given time to the target data packet size parameter stored in the monitor memory unit 206. When the total number of counted bytes equals the target data packet size parameter, the packet monitor unit 204 can determine that the last byte of the data packet 201 has been output from the packet generator unit 200 and ultimately received by the I/O component 130. Accordingly, the packet monitor unit 204 can detect the last byte of the data packet 210 received by the I/O component 130, thus determining the transmission of the data packet 210 has completed.

In response to detecting the last byte of the data packet 210, the packet monitor unit 204 can output an acknowledge byte (e.g., ACK signal) to the packet generator unit 200, which is stored in the main memory 208 or cache injected in the cache memory 202. Once the ACK byte is set, the packet generator unit 200 can determine that the last byte of the generated data packet 201 has been received by the I/O component 130. The time at which the ACK byte is set can be defined as the packet delivery end time. Accordingly, latency attributable to the I/O bridge 106 and/or the uncore system 151 can be determined based at least in part on the packet delivery start time and the packet delivery end time. The details associated with computing a portion of the latency attributable to the I/O bridge 106 and/or the uncore system 151 is described in greater detail below.

In one or more non-limiting embodiments, the latency attributable to the I/O bridge 106 and/or the uncore system 151 can be further determined based on the results of a plurality of latency evaluations. The latency evaluations include: (1) an internal core latency; (2) a packet monitor unit latency; (3) a supplemental uncore latency; and (4) a round-trip-latency.

The internal core latency refers to the latency of the internal core as it transitions to generating a next iteration of a sent data packet. In one or more non-limiting embodiments, the internal core latency can be determined as a difference between the system time $(B(n))$ recorded after setting the ACK byte and the system time $(A(n+1))$ at which a next byte of the data packet is output from the packet generator unit 200. The internal core latency can be expressed as: $Core(n)=B(n)-A(n+1)$.

The turnaround latency refers to the latency associated with the packet monitor unit 204 (e.g., I/O component or FPGA). The latency, i.e., "turnaround" can be determined as a difference between the system time $(C(n))$ at which the packet monitor unit 204 detects the last byte of the data packet and the system time $(D(n))$ at which the ACK byte is set. This turnaround latency can be expressed as: $I/O(n)=D(n)-(Cn)$.

The supplemental uncore latency refers to the latency associated with the uncore system 151, while taking into account the latency attributed with the I/O bridge 106 and the turnaround latency $(I/O(n))$. This supplemental uncore latency can be determined as a difference between the system time $(B(n))$ recorded after setting the ACK byte and the system time $(A(n))$ at which the first byte of the data packet is output from the packet generator unit 200, and can be expressed as: $UCore(n)=B(n)-A(n)$.

The total round trip latency (sometimes referred to as "round trip cost") refers to the difference between the system time $(A(n))$ at which the first byte of the data packet is output from the packet generator unit 200 and the system time $(A(n+1))$ at which the next byte of the data packet is output from the packet generator unit 200. Accordingly, the total round trip latency takes into account additional time from when the packet generator unit 200 detects the ACK byte to the time when the packet generator unit 200 outputs the first byte of the next subsequent data packet to the I/O component 130.

The supplemental uncore latency $(UCore(n))$ and the packet monitor unit turnaround latency $(I/O(n))$ can be utilized to determine a performance or "competitive edge" of a given system platform. For example, a difference between $UCore(n)$ and $I/O(n)$ indicates a performance of a given system platform, and can be expressed as: $P(n)=UCore(n)-I/O(n)$. Accordingly, different performance parameters $(P(n))$ can be compared to one another to determine performance variations between different competing system platforms.

Figure 3:
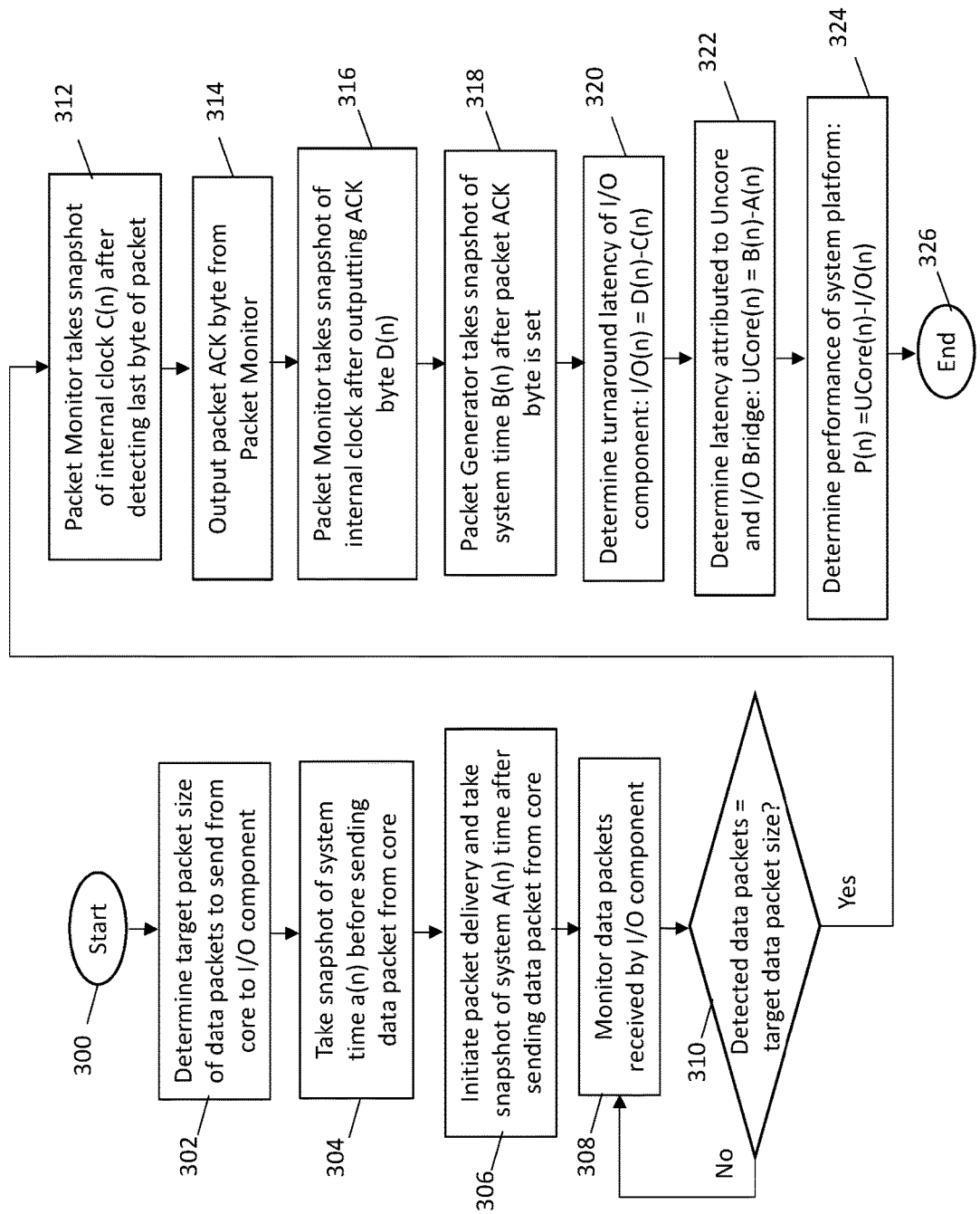
FIG. 3 is a flow diagram illustrating a method of analyzing latency between the uncore system and the I/O bridge according to a non-limiting embodiment of the invention.

Turning now to FIG. 3, a method of analyzing latency attributable to the uncore system and the I/O bridge is illustrated according to a non-limiting embodiment of the invention. The method begins at operation 300 and at operation 302 the packet generator unit 200 determines a target packet size of a data packet to be used to determine a latency attributable to the uncore system 151 and the I/O bridge 106. At operation 304, a time stamp or "snapshot" of the system time $(a(n))$ is taken prior to outputting the data packet from the packet generator unit 200. At operation 306, packet delivery is initiated and a time stamp or "snapshot" of the system time $(A(n))$ is taken in response to outputting a first data byte of the data packet from the packet generator unit 200 located in the core system 150. At operation 308, the packet monitor unit 204 polls (e.g., counts) the data packets received by a targeted I/O component 130 located in the uncore system 151, and at operation 310 compares a current count of the detected data packets to the target packet size. When the count of the detected data packets does not equal the target packet size, the method returns to operation 310 such that the packet monitor unit 204 continues counting the data packets.

When, however, the count of the detected data packets equals the target packet size at operation 310, the packet monitor unit 204 takes a system time stamp or "snapshot" $(C(n))$ at operation 312 after detecting the last data byte. At operation 314, the packet monitor unit 204 sets an ACK byte, and at operation 316 takes a system time stamp or "snapshot" $(D(n))$ after setting the ACK byte. At operation 318, the packet generator unit 200 takes a system time stamp or "snapshot" $(B(n))$ after detecting the set ACK byte. At operation 320, the turnaround latency $(110(n))$ (e.g., associated with the I/O component 130) is determined as the difference between $D(n)$ and $C(n)$. At operation 322, a latency $(UCore(n))$ attributed to the uncore system 151 and the I/O bridge 106 is determined as a difference between $B(n)$ and $A(n)$. Accordingly, a completive performance of the system platform can be determined as a difference between $UCore(n)$ and $I/O(n)$ at operation 324, and the method ends at operation 326.

As described herein, various non-limiting embodiments provide an uncore I/O latency analysis sub-system capable of detecting a portion of the latency attributed to data packet throughput attributed to the uncore system and the I/O bridge. In this manner, a computing system designer can first consider optimizing the data connection between the uncore and I/O bridge before undertaking the more complicated and timing consuming steps of optimizing the core.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computing system comprising:
   a core system including a packet generator unit configured to generate a data packet having a plurality of bytes defining a target packet size, the packet generator unit outputting a first byte among the plurality of bytes at a packet delivery start time;
   an uncore system in signal communication with the core system, the uncore system comprising:
      an input/output (I/O) bridge configured to connect an I/O component to the core system; and
      a packet monitor unit configured to monitor the bytes delivered from the packet generator unit to the I/O component and to determine a packet delivery end time after detecting a last byte of the data packet,
   wherein the computing system determines a latency attributed to one or both of the uncore system and the I/O bridge based at least in part on the packet delivery start time of the data packet, the packet delivery end time of the data packet, and an internal core latency of the internal core defined as a difference between the packet delivery end time of the data packet and a second packet delivery start time of a subsequent data packet delivered from the packet generator unit to the I/O component, and
   wherein the packet monitor unit is installed in the I/O component, the packet monitor unit configured to count the plurality of bytes received by the I/O component and to detect the last byte of the data packet in response to a total number of counted bytes equaling the target packet size.

2. The computing system of claim 1, wherein the packet generator unit is configured to set an acknowledgment (ACK) byte indicating that the last byte of the data packet is delivered to the I/O component.

3. The computing system of claim 2, wherein the packet delivery end time is determined in response to setting the ACK byte.

4. The computing system of claim 2, wherein the latency attributed to the uncore system and the I/O bridge includes a packet monitoring latency associated with the packet monitor unit.

5. The computing system of claim 4, wherein the packet monitoring latency is based on a first time period at which the packet monitor unit detects the first byte of the data packet and a second time period at which the ACK byte is set.

6. The computing system of claim 5, wherein the ACK byte is set in response to the packet monitor unit detecting the last byte of the data packet.

7. A computer-implemented method performed by a computing system comprising a core system and an uncore system, the method comprising:
   generating, by a packet generator unit operating in the core system, a data packet having a plurality of bytes defining a target packet size, and outputting a first byte among the plurality of bytes at a packet delivery start time;
   monitoring, by a packet monitor unit operating in an input/output (I/O) component included in the uncore system, the bytes delivered from the packet generator unit to the I/O component and to determine a packet delivery end time after detecting a last byte of the data packet; and
   determining, by the computing system, a latency attributed to one or both of the uncore system and an I/O bridge based at least in part on the packet delivery start time of the data packet, the packet delivery end time of the data packet, and an internal core latency of the internal core defined as a difference between the packet delivery end time of the data packet and a second packet delivery start time of a subsequent data packet delivered from the packet generator unit to the I/O component;
   operating the packet monitor unit in the I/O component;
   counting, via the packet monitor unit, the plurality of bytes received by the I/O component; and
   detecting, via the packet monitor unit, the last byte of the data packet in response to a total number of counted bytes equaling the target packet size.

8. The method of claim 7, further comprising setting, via the packet generator unit, an acknowledgment (ACK) byte indicating that the last byte of the data packet is delivered to the I/O component.

9. The method of claim 8, further comprising determining the end time in response to setting the ACK byte.

10. The method of claim 8, wherein the latency includes a packet monitoring latency associated with the packet monitor unit.

11. The method of claim 10, further comprising determining the packet monitoring latency based on a first time period at which the packet monitor unit detects the first byte of the data packet and a second time period at which the ACK byte is set.

12. The method of claim 11, further comprising setting the ACK byte in response to the packet monitor unit detecting the last byte of the data packet.

13. A computer program product to control a computing system comprising a core system and an uncore system, the computer program product comprising a computer readable storage medium having program instructions embodied therewith, the program instructions executable by an electronic computer processor to control the electronic device to perform operations comprising:
   generating, by a packet generator unit operating in the core system, a data packet having a plurality of bytes defining a target packet size, and outputting a first byte among the plurality of bytes at a packet delivery start time;
   monitoring, by a packet monitor unit operating in an I/O component included in the uncore system, the bytes delivered from the packet generator unit to the I/O component and to determine a packet delivery end time after detecting a last byte of the data packet;
   counting, via the packet monitor unit, the plurality of bytes received by the I/O component;
   detecting, via the packet monitor unit, the last byte of the data packet in response to a total number of counted bytes equaling the target packet size; and
   determining, by the computing system, a latency attributed to one or both of the uncore system and an I/O bridge based at least in part on the packet delivery start time of the data packet, the packet delivery end time of the data packet, and an internal core latency of the internal core defined as a difference between the packet delivery end time of the data packet and a second packet delivery start time of a subsequent data packet delivered from the packet generator unit to the I/O component.

14. The computer program product of claim 13, further comprising setting, via the packet generator unit, an acknowledgment (ACK) byte indicating that the last byte of the data packet is delivered to the I/O component.

15. The computer program product of claim 14, further comprising determining the end time in response to setting the ACK byte.

16. The computer program product of claim 14, wherein the latency includes a packet monitoring latency associated with the packet monitor unit.

17. The computer program product of claim 16, further comprising:
 determining the packet monitoring latency based on a first time period at which the packet monitor unit detects the first byte of the data packet and a second time period at which the ACK byte is set; and
 setting the ACK byte in response to the packet monitor unit detecting the last byte of the data packet.

\* \* \* \* \*